United States Patent
Evans, Jr. et al.

(10) Patent No.: US 10,233,984 B2
(45) Date of Patent: Mar. 19, 2019

(54) MULTIPLE FUNCTION BRAKE CALIPER GUIDE PIN

(71) Applicant: Ford Global Technologies, LLC, Dearborn, MI (US)

(72) Inventors: Charles K. Evans, Jr., Willis, MI (US); JeLane McKinney, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/494,744

(22) Filed: Apr. 24, 2017

(65) Prior Publication Data

US 2018/0306256 A1 Oct. 25, 2018

(51) Int. Cl.
*F16D 55/22* (2006.01)
*F16D 65/00* (2006.01)
*F16D 55/2265* (2006.01)
*F16D 66/02* (2006.01)

(52) U.S. Cl.
CPC ... *F16D 55/22655* (2013.01); *F16D 65/0068* (2013.01); *F16D 66/021* (2013.01)

(58) Field of Classification Search
CPC . F16D 55/22655; F16D 66/021; F16D 66/027
USPC .......................................... 188/73.43–73.45
See application file for complete search history.

(56) References Cited

U.S. PATENT DOCUMENTS 3,297,985 A * 1/1967 Trebonsky ............ F16D 66/024
  188/1.11 L
4,162,111 A * 7/1979 Brown .................. B06B 1/0666
  310/326
4,171,035 A * 10/1979 Takaaki ................. F16D 55/227
  188/73.45
4,280,594 A * 7/1981 Baum .................... F16D 66/025
  188/1.11 W
4,722,425 A * 2/1988 Weiler ................... F16D 55/227
  188/73.34
5,087,907 A * 2/1992 Weiler .............. F16D 55/22655
  188/1.11 L
5,111,914 A * 5/1992 Thiel ..................... F16D 55/227
  188/73.1

(Continued)

FOREIGN PATENT DOCUMENTS

DE    102005022597 A1   11/2006
WO      2013143992 A1   10/2013

*Primary Examiner* — Thomas J Williams
*Assistant Examiner* — James K Hsiao
(74) *Attorney, Agent, or Firm* — LeClairRyan

(57) ABSTRACT

A multiple function brake caliper guide pin for use with a wireless transmitter to transmit brake wear data is disclosed. The pin is part of a brake assembly that includes a brake caliper, a caliper yoke for supporting the caliper in relation to the rotor, opposed brake pads, a wear sensor, and a brake wear sensing assembly comprising a brake caliper guide pin and a wireless transmitter system. The guide pin may be either of a two-piece or a one-piece design and includes a transmitter system attachment end and a yoke attachment end. The transmitter system includes a sensor for sensing brake pad wear and a wireless transmitter for transmitting the sensed wear to a receiver in the vehicle. The sensor may include a tether attached to a brake pad or may include a transmitter and magnet assembly fitted to one or the other of the caliper or the yoke.

14 Claims, 8 Drawing Sheets

(56) References Cited

U.S. PATENT DOCUMENTS

| | | | | |
|---|---|---|---|---|
| 5,279,394 A * | 1/1994 | Wollenweber | | B60T 8/52 188/1.11 E |
| 5,372,221 A * | 12/1994 | Jalbert | | B60T 17/22 188/1.11 L |
| 5,460,247 A * | 10/1995 | Fouts | | B60T 17/046 138/125 |
| 5,632,359 A * | 5/1997 | Camps | | F16D 55/22655 188/1.11 L |
| 5,788,341 A * | 8/1998 | Penrod | | B60T 8/00 188/156 |
| 5,819,884 A * | 10/1998 | Giering | | F16C 19/502 188/71.9 |
| 5,848,673 A * | 12/1998 | Strauss | | F16D 65/568 188/1.11 L |
| 6,076,639 A * | 6/2000 | Dahlen | | F16D 66/02 188/1.11 R |
| 6,272,914 B1 * | 8/2001 | Ciotti | | F16D 55/22655 188/11 |
| 6,481,539 B1 * | 11/2002 | Shaw | | F16D 55/22655 188/1.11 E |
| 6,511,135 B2 * | 1/2003 | Ballinger | | B60T 8/3275 303/112 |
| 6,609,419 B1 * | 8/2003 | Bankart | | B60C 23/0428 200/61.22 |
| 6,637,262 B2 * | 10/2003 | Chang | | G01L 5/28 188/11 |
| 6,668,983 B2 * | 12/2003 | Drennen | | F16D 55/227 188/181 T |
| 7,431,132 B2 * | 10/2008 | Schog | | F16D 65/092 188/73.39 |
| 7,926,626 B2 * | 4/2011 | Iraschko | | F16D 65/567 188/196 F |
| 8,047,336 B2 * | 11/2011 | Niehorster | | F16D 65/54 188/1.11 L |
| 8,207,729 B2 * | 6/2012 | Erickson | | G01D 5/2013 324/207.25 |
| 8,717,159 B2 | 5/2014 | Todd et al. | | |
| 8,770,351 B2 | 7/2014 | Engles | | |
| 9,279,468 B1 * | 3/2016 | Philpott | | F16D 66/021 |
| 9,482,301 B2 * | 11/2016 | Lamkin | | F16D 55/38 |
| 9,511,755 B2 * | 12/2016 | Seglo | | B60T 17/22 |
| 9,618,067 B2 * | 4/2017 | Philpott | | F16D 65/66 |
| 2005/0014393 A1 * | 1/2005 | Cortinovis | | F16D 66/021 439/34 |
| 2005/0039988 A1 * | 2/2005 | Philpott | | F16D 55/227 188/1.11 R |
| 2005/0161290 A1 * | 7/2005 | Donadoni | | F16D 66/021 188/1.11 L |
| 2005/0212357 A1 * | 9/2005 | Adams | | B60T 17/18 303/122.03 |
| 2006/0021832 A1 * | 2/2006 | Usui | | F16D 55/226 188/73.1 |
| 2006/0163834 A1 * | 7/2006 | Brereton | | B60G 7/001 280/124.128 |
| 2008/0073161 A1 * | 3/2008 | Pettersson | | B60T 17/221 188/1.11 L |
| 2009/0000882 A1 * | 1/2009 | Siebke | | F16D 55/22655 188/73.45 |
| 2010/0253497 A1 * | 10/2010 | Bakker | | F16D 66/026 340/454 |
| 2011/0012724 A1 * | 1/2011 | Elstorpff | | F16D 66/02 340/454 |
| 2011/0119869 A1 * | 5/2011 | Martin | | B25G 1/04 16/429 |
| 2011/0133923 A1 * | 6/2011 | Evans | | B60T 17/221 340/454 |
| 2011/0254679 A1 * | 10/2011 | Todd | | B60T 17/221 340/454 |
| 2013/0026731 A1 * | 1/2013 | Mikura | | B60B 27/0068 280/279 |
| 2013/0068571 A1 * | 3/2013 | Welin | | F16D 66/027 188/72.1 |
| 2013/0192933 A1 * | 8/2013 | King | | B60T 17/221 188/1.11 L |
| 2015/0107943 A1 * | 4/2015 | Yokoyama | | F16D 55/226 188/72.3 |
| 2015/0152930 A1 * | 6/2015 | Uffelman | | F16D 65/18 188/161 |
| 2016/0076956 A1 * | 3/2016 | Finch, Jr. | | G01L 5/28 73/121 |
| 2016/0146279 A1 * | 5/2016 | Philpott | | B60T 8/885 188/1.11 L |
| 2016/0363182 A1 * | 12/2016 | Eden | | F16D 66/024 |

* cited by examiner

MULTIPLE FUNCTION BRAKE CALIPER GUIDE PIN

TECHNICAL FIELD

The disclosed inventive concept relates generally to braking systems for vehicles. More particularly, the disclosed inventive concept relates to a brake caliper guide pin arrangement that includes a multiple function brake caliper guide pin having a wireless transmitter system attached thereto. The wireless transmitter system is capable of transmitting the status of the condition of a brake pad as determined by a wear sensor.

BACKGROUND OF THE INVENTION

Most vehicles today, particularly most passenger vehicles, utilize disk brake arrangements for braking. Of these, almost all disk brake arrangements have so-called floating caliper disc brakes. The caliper of the floating caliper disc brake is movably mounted on a yoke or bracket that is fixed to the axle housing. According to this arrangement, the floating caliper can slide in a direction that is parallel with the long axis of the brake rotor. The brake caliper retains a pair of spaced apart and opposed pads that are placed on either side of the brake rotor. A movable piston is provided in the brake caliper and in operative association with one of the brake pads.

The brake caliper is provided with a pair of spaced apart guide pins that pass through corresponding apertures formed in ears provided on the yoke. In this way the pins secure the brake caliper to the yoke. The floating brake caliper has an advantage over non-floating brake calipers in that it is durable and can readily self-adjust to take up wear on the brake pads over time in vehicle operation. The components of the brake assembly can also be formed from lightweight and low cost materials.

Because the brake pads wear over time, it is desirable to provide a brake pad wear sensing system that transmits the information to the vehicle operator. While it is known for the vehicle operator to feel and, in some instances, hear worn brake pads based on grooves formed in the face of the pad, more recent wear sensors are provided that electronically sense brake pad wear. Traditional electronic wear sensors used wires and connectors which connect the brake pad sensors to an electronic module on the vehicle. These wired sensors require long wiring runs and flexible connections to the wheel ends making them expensive and prone to damage.

In response, wireless wear sensors are offered on some vehicles. This is possible because wireless wear sensors are becoming less expensive and avoid many of these failure modes. Wireless components associated with brake systems require batteries for operation. However, while a simple concept, in execution the idea of batter-operated wireless components are challenged by environmental factors such as vehicle-generated heat. Accordingly, batteries on wireless components, such as brake wear sensors, must be kept cool. Otherwise, the batteries rapidly degrade and lose transmission capability. Finding an acceptable location for a transmitter in relation to a wheel end environment is particularly difficult because of the heat generated by the brake and by the bearing inside the wheel.

There is thus a demand in the industry for an improved system of wireless transmission of brake pad condition. Adding to this demand is the autonomous vehicles which isolate the passenger's ability to feel a vehicles dynamic performance. Without this connectivity, it may not be possible for vehicle owners to feel when their brakes are worn out and their vehicle needs maintenance. Reacting to this, there is a growing need to have electronic brake pad sensors installed onto vehicles.

Thus a new approach to the pendulum bumpers is needed to address the problems associated with known arrangements.

SUMMARY OF THE INVENTION

The disclosed inventive concept overcomes the challenges faced by known brake caliper guide pin arrangements. In particular, the disclosed inventive concept overcomes the challenges faced by such guide pin arrangements having wear sensors.

Most floating brake calipers already use one or two-piece guide pin bolts which allow the caliper housing to slide relative to the caliper anchor bracket or yoke. When a second threaded feature is added to this guide pin bolt, it becomes a convenient attaching point for a wireless brake pad sensor transmitting unit. The location of these pins is separate from the brake, providing a cool environment where the electronic wear sensor transmitting unit can be mounted.

Accordingly, the disclosed inventive concept provides a brake assembly for a wheeled vehicle that comprises a brake rotor, a brake caliper, a caliper yoke for supporting the caliper in relation to the rotor, a pair of opposed brake pads, a wear sensor, and a brake wear sensing assembly comprising a brake caliper guide pin and a wireless transmitter. The wear sensor may be provided in association with one of the brake pads by a tether that electronically connects the brake pad to the sensor or may be a two-piece arrangement in which the transmitting unit is fixed to one or the other of the brake caliper or the caliper yoke and a magnet is fixed to the other of the brake caliper or the caliper yoke. The guide pin includes a transmitter attachment end and a yoke attachment end. The transmitter is attached to the end of the guide pin farthest away from the brake rotor or other heat-generating brake assembly components.

The caliper guide pin may be either of a two-piece or a one-piece design. The two-piece guide pin includes a double-ended attaching bolt and a caliper guide pin. One of the threaded ends of the double-ended attaching bolt is threaded into the wireless transmitter or to the magnet. The other end of the double-ended attaching bolt is threaded into the caliper guide pin. The one-piece guide pin includes a first threaded end for attachment to the wireless transmitter or to the magnet and a pin end having an external thread portion, the ends being integrally formed. The external thread portion of the one-piece guide pin is threaded into an ear formed on the brake caliper yoke.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
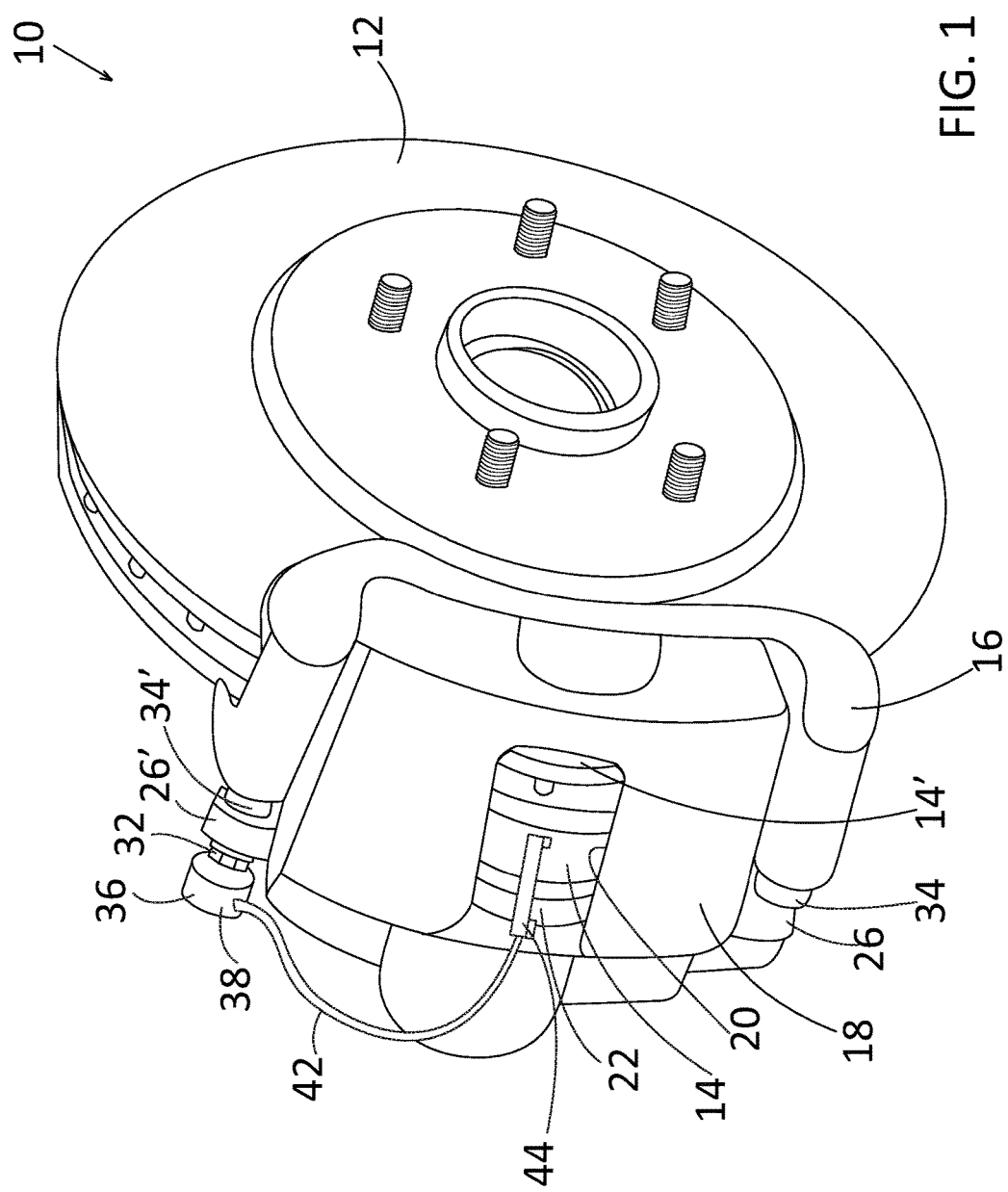
FIG. 1 is perspective view of a brake assembly incorporating the multiple function brake caliper guide pin according to the disclosed inventive concept.

In the following figures, the same reference numerals will be used to refer to the same components. In the following description, various operating parameters and components are described for different constructed embodiments. These specific parameters and components are included as examples and are not meant to be limiting.

Figure 4:
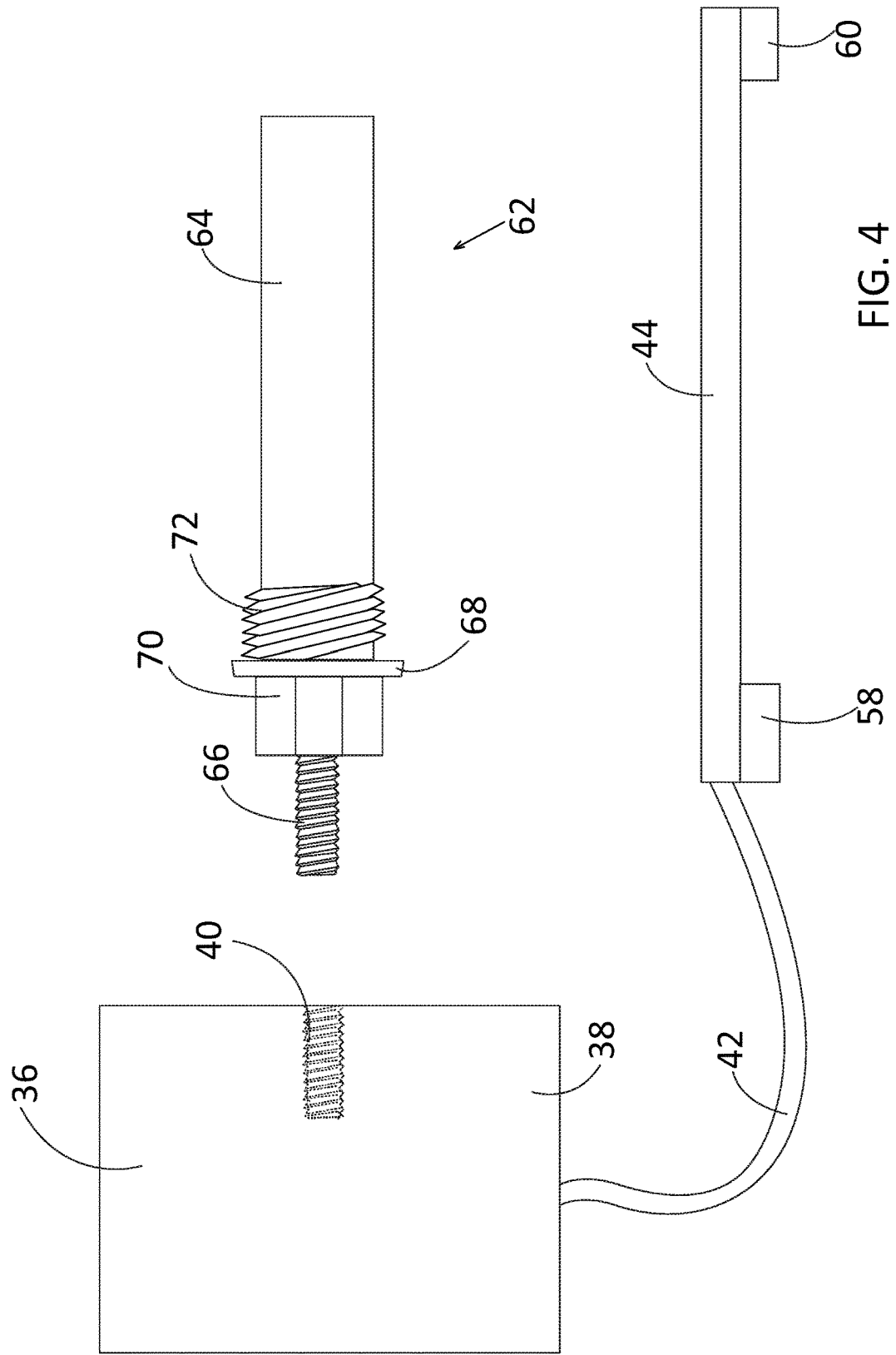
FIG. 4 is side view of a one-piece caliper guide pin bolt with mounting feature shown in partial cross-section according to another embodiment of the disclosed inventive concept.
Figure 5:
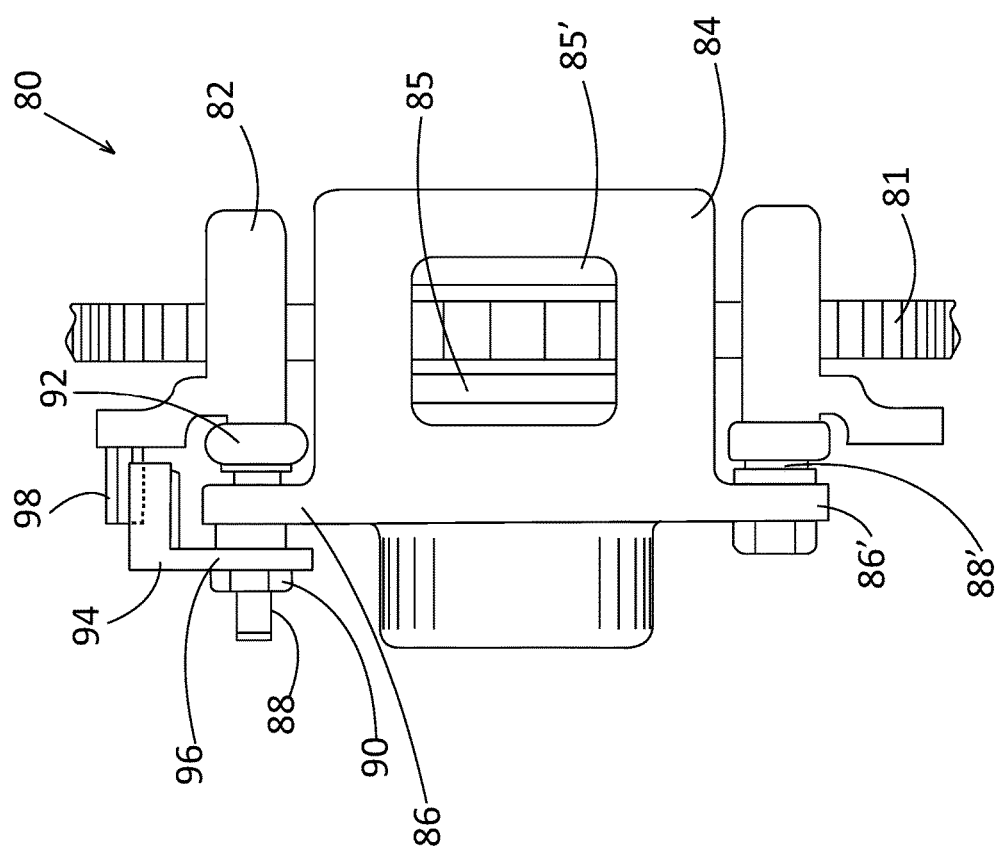
FIG. 5 is partial view of a sensor/transmitter and a target magnet arrangement in place respectively on a caliper pin and caliper yoke arrangement according to an alternate embodiment of the disclosed inventive concept.
Figure 6:
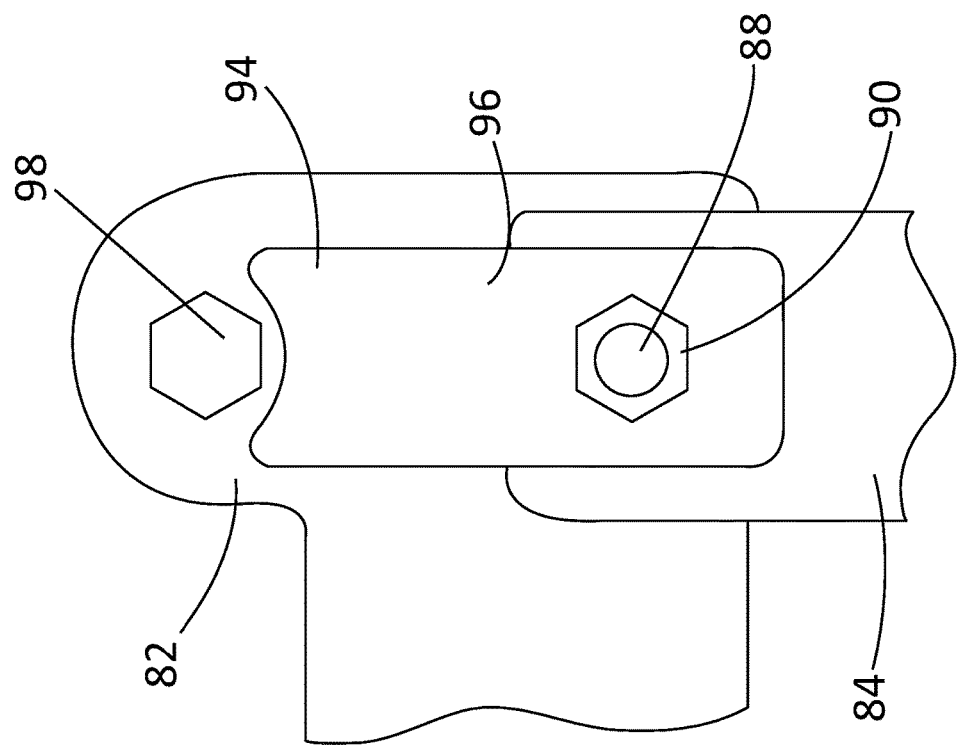
FIG. 6 is partial top view the sensor/transmitter and a target magnet arrangement of the alternate embodiment of FIG. 5.
Figure 7:
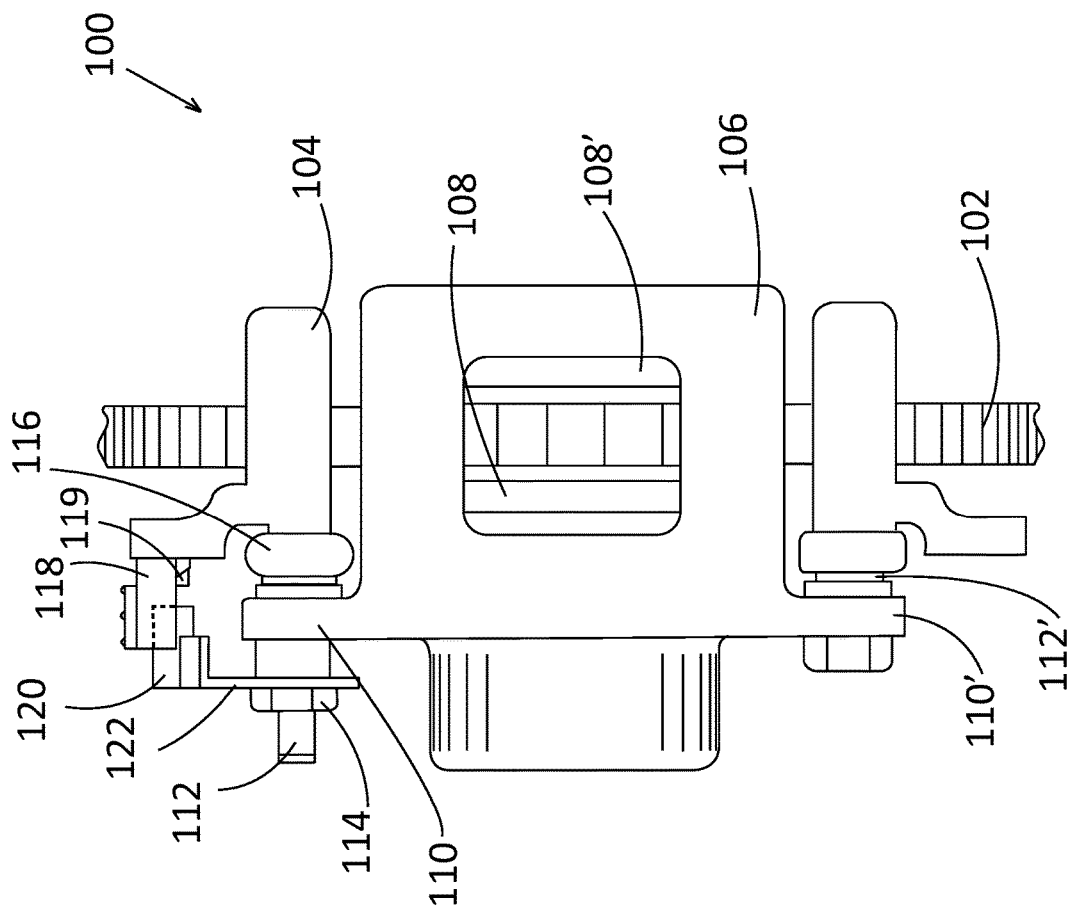
FIG. 7 is partial view of a sensor/transmitter and a target magnet arrangement in place respectively on a caliper yoke and caliper pin arrangement according to a further alternate embodiment of the disclosed inventive concept.
Figure 8:
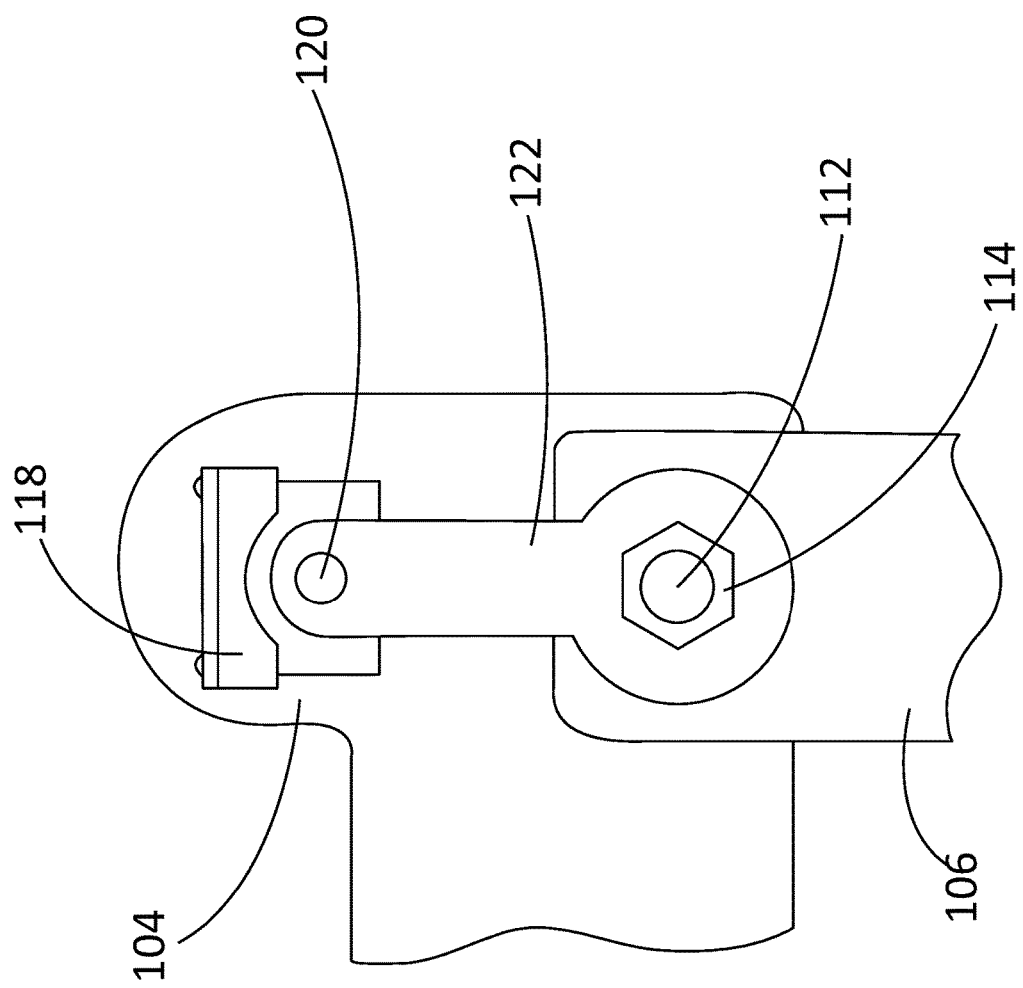
FIG. 8 is partial top view the sensor/transmitter and a target magnet arrangement of the further alternate embodiment of FIG. 7.

Three possible variations of the disclosed inventive concept are illustrated herein although it is envisioned that further embodiments may be developed without deviating from either the spirit of the invention or the invention as claimed. In particular, one embodiment of the disclosed inventive concept is illustrated in FIGS. 1 through 4 in which a wear sensor is provided in association with one of the brake pads by a tether that electronically connects the brake pad to the sensor. An alternative, two-piece wear sensor arrangement of the disclosed inventive concept is illustrated in FIGS. 5 and 6 in which the sensor/transmitting unit is fixed to brake caliper and a magnet is fixed to the caliper yoke. An additional alternative, two-piece wear sensor arrangement of the disclosed inventive concept is illustrated in FIGS. 7 and 8 in which the magnet is fixed to brake caliper and the sensor/transmitting unit is fixed to the caliper yoke.

Figure 2:
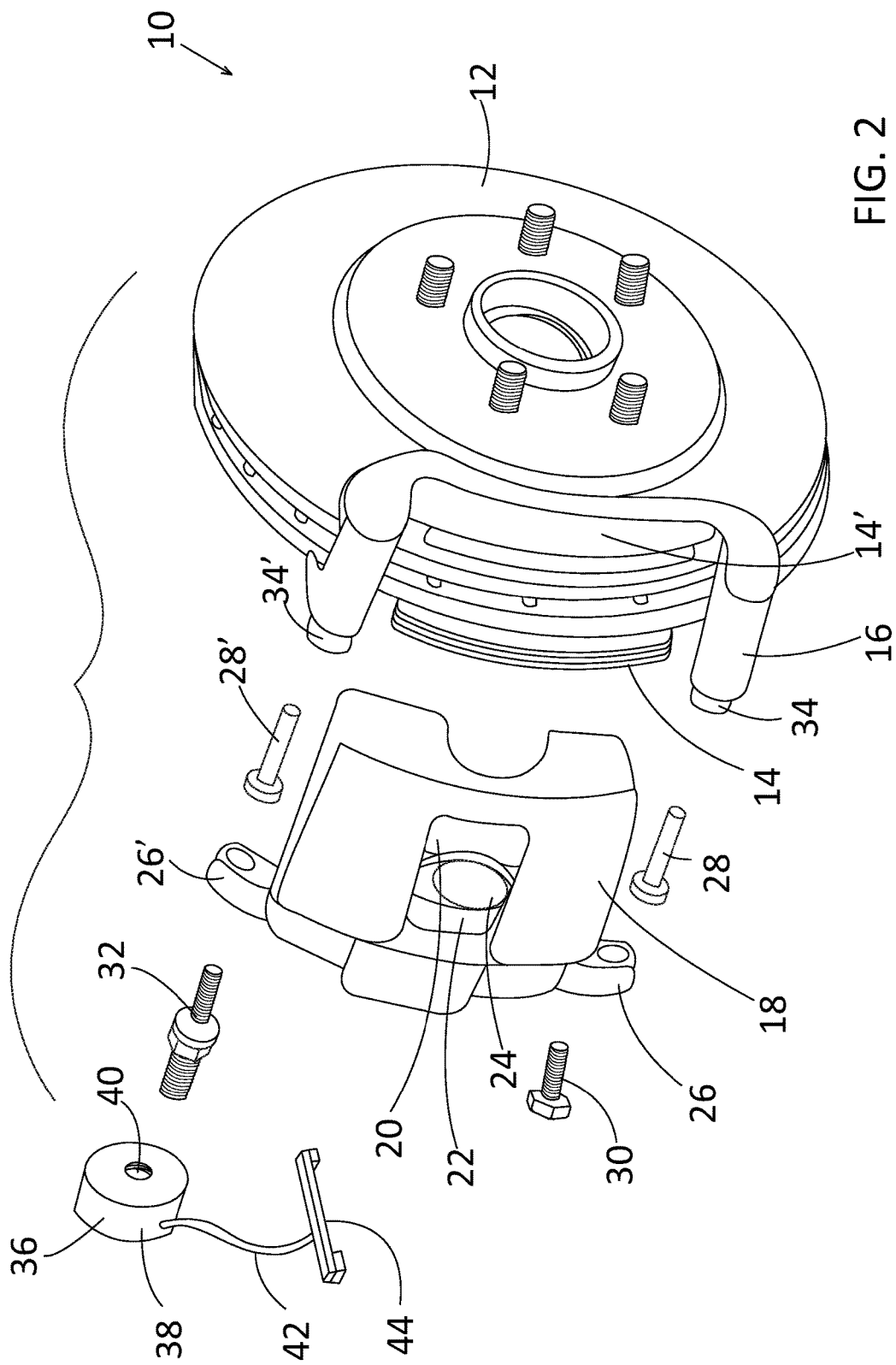
FIG. 2 is a perspective view of a brake assembly incorporating the multiple function brake caliper guide pin according to the disclosed inventive concept similar to the view shown in FIG. 1 but showing a portion of the assembly in exploded view.

Referring to FIGS. 1 and 2, a brake assembly incorporating the multiple function brake caliper guide pin according to the disclosed inventive concept is shown. The brake assembly, generally illustrated as 10, includes a brake rotor 12 fixedly attached to an axle shaft (not shown). A pair of opposed brake pads 14 and 14' is provided whereby the one pad 14 is positioned against one side of the brake rotor 12 and the other pad 14' is positioned against the opposite side of the brake rotor 12.

A brake caliper yoke 16 is fixedly attached to the axle shaft housing (not shown). Movably attached to the brake caliper yoke 16 is a floating brake caliper 18. The floating brake caliper 18 includes a brake pad wear inspection aperture 20 for visual inspection of the brake pads 14 and 14'.

A single piston assembly 22 is positioned within an aperture formed in the floating brake caliper 18. The single piston assembly 22 includes a movable piston 24. The brake pad 14 is positioned between the movable piston 24 of the single piston assembly 22 and the brake rotor 12. The brake pad 14' is positioned between an inner surface of the brake caliper 18 (opposite the single piston assembly 22) and the brake rotor 12. As is understood in the art, the movable piston 24 provides force against the backside of the brake pad 14 when pressure is applied by the vehicle operator upon the vehicle's brake pedal (not shown). Because the brake pad 14' is fixedly positioned against an interior surface of the floating brake caliper 18, movement of the movable piston 24 against the back side of the brake pad 14 causes both brake pads 14 and 14' to be pulled toward one another, thus applying braking pressure to the brake rotor 12.

It is to be understood that the specific shape and size of the brake rotor 12, the brake pads 14 and 14', the brake caliper yoke 16 and the floating brake caliper 18 as illustrated are suggestive only and are not intended as being limiting. The multiple function brake caliper guide pin according to the disclosed inventive concept can find application with a broad variety of brake assemblies without being limited by the illustrated configurations.

The floating brake caliper 18 includes a pair of spaced-apart mounting ears 26 and 26' for movable attachment of the floating brake caliper 18 to the brake caliper yoke 16. Movement of the floating brake caliper 18 relative to the brake caliper yoke 16 is made possible by a pair of smooth, spaced apart brake caliper mounting pins 28 and 28'. The brake caliper mounting pin 28 is fixedly attached to the mounting ear 26 by a bolt 30. The brake caliper mounting pin 28' is fixedly attached to the mounting ear 26' by a double-ended attaching bolt 32.

The brake caliper yoke 16 includes a pair of spaced apart pin bushings 34 and 34'. The brake caliper mounting pin 28 is slidably inserted into the pin bushing 34 and the brake caliper mounting pin 28' is slidably inserted into the pin bushing 34'.

The brake assembly 10 of the disclosed inventive concept provides a wireless arrangement for signalling brake pad wear. In particular, the disclosed inventive concept includes a wireless brake lining wear sensor assembly 36. The wear sensor assembly 36 includes a wireless brake pad transmitter 38 having a threaded aperture 40 centrally formed therein for attachment to one end of the double-ended attaching bolt 32. (The other end of the double-ended attaching bolt 32 passes through the mounting ear 26' of the brake caliper 18 and is threadably attached to the brake caliper mounting pin 28'.)

The wireless brake lining wear sensor assembly 36 further includes an electronic tether 42 that is attached at one end to the wireless brake pad transmitter 38 and at another end to a brake pad wear sensor head 44. As is known in the art, one end of the brake pad wear sensor head 44 is fixedly attached to the brake caliper 18 and the other end of the brake pad wear sensor head 44 is fixedly attached to the brake pad 14 by, for example, a flexible clip (not shown). The brake pad wear sensor head 44 senses the distance between the brake caliper 18 and the brake pad 14 and transmits that information to the wireless brake pad transmitter 38 via the electronic tether 42. This information is subsequently transmitted wirelessly to a strategically located receiver in the vehicle (not shown) for recording and analysis.

The wireless brake lining wear sensor assembly of the disclosed inventive concept is presented as two embodiments although it is to be understood that other embodiments are possible without deviating from either the scope or the spirit of the invention as described. One such embodiment, a two-piece pin, is illustrated in FIG. 3 while the other embodiment, a one-piece pin, is illustrated in FIG. 4.

Figure 3:
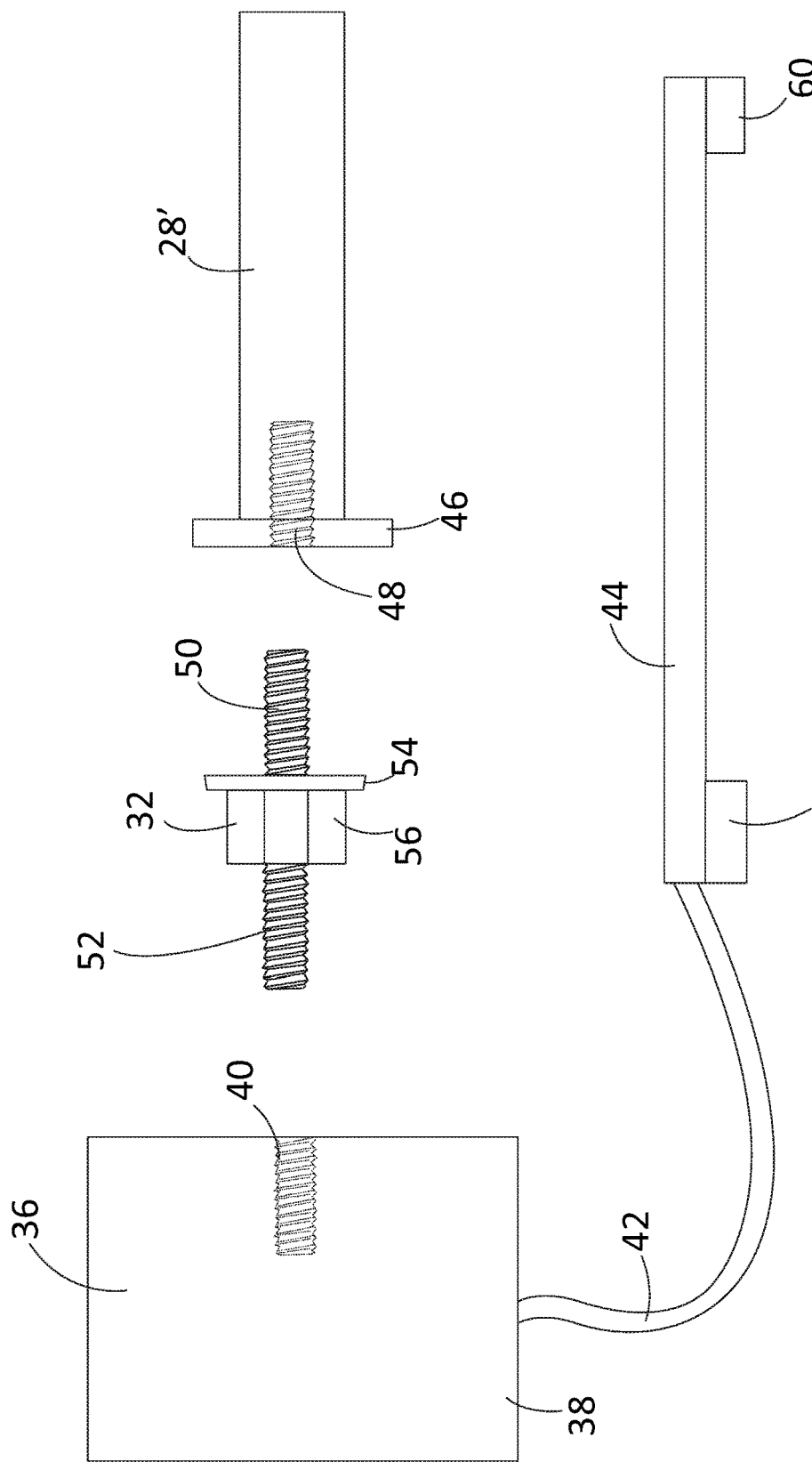
FIG. 3 is side view of the two-piece caliper guide pin bolt of FIG. 2 with mounting feature shown in partial cross-section according to one embodiment of the disclosed inventive concept.

Referring to FIG. 3, the wireless brake lining wear sensor assembly 36, the double-ended attaching bolt 32, and the slidable brake caliper mounting pin 28' are illustrated from the side and in partial cross-section. This view provides additional design detail of one embodiment of the disclosed inventive concept. Particularly, the slidable brake caliper mounting pin 28' includes a shoulder 46 and a centrally formed threaded aperture 48. The double-ended attaching bolt 32 includes a first threaded end 50 and a second threaded end 52. The double-ended attaching bolt 32 further includes a shoulder 54 and a fastening tool attachment area such as a hexagonal body 56.

When assembled, the second threaded end 52 is threaded into the threaded aperture 40 of the wireless brake pad transmitter 38 thereby fixing the two components together. The first threaded end 50 of the double-ended attaching bolt 32 is passed through an ear of the brake caliper and is inserted into the threaded aperture 48, thereby fixing the double-ended attaching bolt 32 to the brake caliper mounting pin 28' and capturing the ear therebetween.

FIG. 3 also illustrates the brake pad wear sensor head 44. As illustrated, the brake pad wear sensor head 44 includes a first end 58 that is fixed to the brake caliper and a second end 60 that is attached to the brake pad closest to the piston assembly. The brake pad wear sensor head 44 as shown in the figures is only suggestive as other variations of the sensor head are possible without deviating from the disclosed inventive concept.

Referring to FIG. 4, an alternative embodiment of the caliper guide pin construction according to the disclosed inventive concept is illustrated from the side and in partial cross section. According to the embodiment illustrated in this figure, a combination fastener and pin is generally illustrated as 62. The combination fastener and pin 62 includes a smooth pin end 64 for insertion into the bushing attached to the caliper yoke. The combination fastener and pin 62 further includes a threaded attachment end 66 for threaded attachment into the threaded aperture 40 of the wireless brake pad transmitter 38 thereby fixing the two components together. The combination fastener and pin 62 further includes a shoulder 68 and a fastening tool attachment area such as a hexagonal body 70.

The combination fastener and pin 62 further includes a thread 72. According to this embodiment, the thread 72 of the combination fastener and pin 62 may be threaded directly into an ear of the brake caliper, thereby avoiding the two-part arrangement of the double-ended attaching bolt 32.

Referring to FIGS. 5 and 6, a brake assembly incorporating the multiple function brake caliper guide pin according to an alternate embodiment of the disclosed inventive concept is shown. A portion of a brake assembly, generally illustrated as 80, includes a brake rotor 81 and a brake caliper yoke 82 that is fixedly attached to the vehicle's axle shaft housing (not shown). Movably attached to the brake caliper yoke 82 is a floating brake caliper 84. A brake pad 85 is fitted to one side of the brake rotor 81 and a brake pad 85' is fitted to the other side of the brake rotor 81. The floating brake caliper 84 includes a pair of spaced-apart mounting ears 86 and 86' for movable attachment of the floating brake caliper 84 to the brake caliper yoke 82.

As set forth above in relation to the embodiment of the guide pin arrangement shown in FIGS. 1 through 4 and discussed in relation thereto, movement of the floating brake caliper 84 relative to the brake caliper yoke 82 is made possible by a pair of smooth, spaced apart brake caliper mounting pins. As shown in FIG. 5, one version of the brake caliper pin is illustrated as a brake caliper bolt extension 88 having a bolt extension nut 90 attached thereto. The brake caliper bolt extension 88 is fixedly attached to the mounting ear 86 while a brake caliper pin 88' is fitted to the mounting ear 86'.

A brake caliper pin bushing 92 is fitted between the mounting ear 86 and the brake caliper yoke 82. Attached between the bolt extension nut 90 and mounting ear 86 is a sensing/transmitting unit 94. An arm 96 extends from the sensing/transmitting unit 94 for attachment to the brake caliper bolt extension 88. A target magnet 98 is fixed to the brake caliper yoke 82 by, for example, threading. The sensing/transmitting unit 94 works in conjunction with the target magnet 98 to identify the relationship between the floating brake caliper 84 and the brake caliper yoke 82 and to determine any change in that relationship, such a change identifying wear of one or both of the brake pads 85 and 85'. This information is then transmitted to a receiver fitted to the vehicle as discussed above with respect to the embodiment illustrated in FIGS. 1 through 4 and as discussed in relation thereto.

Referring to FIGS. 7 and 8, a brake assembly incorporating the multiple function brake caliper guide pin according to another alternate embodiment of the disclosed inventive concept is shown. A portion of a brake assembly, generally illustrated as 100, includes a brake rotor 102 and a brake caliper yoke 104 that is fixedly attached to the vehicle's axle shaft housing (not shown). Movably attached to the brake caliper yoke 104 is a floating brake caliper 106. A brake pad 108 is fitted to one side of the brake rotor 102 and a brake pad 108' is fitted to the other side of the brake rotor 102. The floating brake caliper 106 includes a pair of spaced-apart mounting ears 110 and 110' for movable attachment of the floating brake caliper 106 to the brake caliper yoke 104.

As noted above, movement of the floating brake caliper 106 relative to the brake caliper yoke 104 is made possible by a pair of smooth, spaced apart brake caliper mounting pins. As shown in FIG. 7, one version of the brake caliper pin is illustrated as a brake caliper bolt extension 112 having a bolt extension nut 114 attached thereto. The brake caliper bolt extension 112 is fixedly attached to the mounting ear 110 while a brake caliper pin 112' is fitted to the mounting ear 110'.

A brake caliper pin bushing 116 is fitted between the mounting ear 110 and the brake caliper yoke 104. Attached to the brake caliper yoke 104 is a sensing/transmitting unit 118. The sensing/transmitting unit 118 is attached to the brake caliper yoke 104 by a mechanical fastener 119. A target magnet 120 is connected to the brake caliper bolt extension 112 by a target magnet extension arm 122. The target magnet 120 is fixed to the brake caliper bolt extension 112 by the bolt extension nut 114. The sensing/transmitting unit 118 works in conjunction with the target magnet 120 to identify the relationship between the floating brake caliper 106 and the brake caliper yoke 104 and to determine any change in that relationship, such a change identifying wear of one or both of the brake pads 108 and 108'. This information is then transmitted to a receiver fitted to the vehicle as discussed above with respect to the embodiments illustrated in FIGS. 1 through 4 and FIGS. 5 and 6 and as discussed in relation thereto.

The disclosed inventive concept as set forth above overcomes the challenges faced by known sensors for determining brake wear by providing a simple and reliable arrangement that is relatively remote from heat-generating components. The arrangement may be adapted for use on any of several brake systems and may be retrofitted for use on existing brake systems.

One skilled in the art will readily recognize from such discussion, and from the accompanying drawings and claims that various changes, modifications and variations can be made therein without departing from the true spirit and fair scope of the invention as defined by the following claims.

What is claimed is:

1. A brake assembly for a wheeled vehicle, the assembly comprising:
    a brake rotor;
    a brake caliper;
    a caliper yoke for supporting said caliper in relation to said rotor;
    a pair of opposed brake pads;
    a wear sensor associated with at least one of said brake pads; and
    a brake wear sensing assembly comprising a brake caliper guide pin and a wireless transmitter, said brake caliper guide pin including a mounting pin and an attaching bolt, said attaching bolt having a threaded transmitter attachment end and a threaded mounting pin attachment end extending in opposite directions from a body of said attaching bolt, said mounting pin being slidably insertable into said caliper yoke, said brake caliper being secured between said body of said attaching bolt and said mounting pin.

2. The brake assembly for a wheeled vehicle of claim 1 wherein said threaded transmitter attachment end is attachable to said wear sensor.

3. The brake assembly for a wheeled vehicle of claim 2 wherein said caliper yoke includes a pin support ear and wherein said pin support ear is secured between said body of said attaching bolt and said mounting pin.

4. The brake assembly for a wheeled vehicle of claim 1 wherein said caliper guide pin is one-piece.

5. The brake assembly for a wheeled vehicle of claim 4 wherein said one-piece guide pin comprises a first threaded end and a pin end having a threaded portion, said ends being integrally formed.

6. The brake assembly for a wheeled vehicle of claim 5 wherein said first threaded end is attachable to said wear sensor.

7. The brake assembly for a wheeled vehicle of claim 5 wherein said caliper yoke includes a pin support ear having a threaded aperture and wherein said pin end includes a threaded portion, said threaded portion being threaded into said threaded aperture of said pin support ear.

8. A brake assembly for a wheeled vehicle, the assembly comprising:
    a brake rotor;
    a brake caliper;
    a caliper yoke for supporting said caliper in relation to said rotor;
    a pair of opposed brake pads;
    a wear sensor associated with at least one of said brake pads; and
    a brake wear sensing assembly comprising a brake caliper guide pin and a wireless transmitter associated with said brake caliper guide pin and said wear sensor, said brake caliper guide pin including a mounting pin and an attaching bolt, said attaching bolt having a threaded transmitter attachment end and a threaded mounting pin attachment end extending in opposite directions from a body of said attaching bolt, said mounting pin having a threaded aperture for receiving said threaded mounting pin attachment end.

9. The brake assembly for a wheeled vehicle of claim 8 wherein said threaded transmitter attachment end is attachable to said wear sensor and said mounting pin is slidably insertable into said caliper yoke.

10. The brake assembly for a wheeled vehicle of claim 9 wherein said caliper yoke includes a pin support ear and wherein said support ear is secured between said body of said attaching bolt and said mounting pin.

11. The brake assembly for a wheeled vehicle of claim 8 wherein said caliper guide pin is one-piece.

12. The brake assembly for a wheeled vehicle of claim 11 wherein said one-piece guide pin comprises a first threaded end and a pin end having an external thread portion, said ends being integrally formed.

13. The brake assembly for a wheeled vehicle of claim 12 wherein said first threaded end is attachable to said wear sensor.

14. The brake assembly for a wheeled vehicle of claim 12 wherein said caliper yoke includes a pin support ear having a threaded aperture and wherein said pin end includes a threaded portion, said threaded portion being threaded into said threaded aperture of said pin support ear.

* * * * *